US008917582B2

(12) United States Patent
Gregorian et al.

(10) Patent No.: US 8,917,582 B2
(45) Date of Patent: Dec. 23, 2014

(54) ANALOG ECHO CANCELLER WITH INTERPOLATING OUTPUT

(75) Inventors: Roubik Gregorian, Saratoga, CA (US); Gaurav Malhotra, Santa Clara, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 604 days.

(21) Appl. No.: 12/916,425

(22) Filed: Oct. 29, 2010

(65) Prior Publication Data

US 2011/0044397 A1    Feb. 24, 2011

Related U.S. Application Data

(63) Continuation of application No. 12/236,408, filed on Sep. 23, 2008, now Pat. No. 7,839,758.

(51) Int. Cl.
*H04B 15/00*    (2006.01)
*H04B 3/23*    (2006.01)

(52) U.S. Cl.
CPC ...................... *H04B 3/23* (2013.01)
USPC ............ 370/201; 370/235; 375/285

(58) Field of Classification Search
USPC .................. 370/286, 288; 375/285
See application file for complete search history.

(56) References Cited

U.S. PATENT DOCUMENTS

| 4,527,020 A * | 7/1985 | Ito ............................. 379/406.06 |
| 5,148,488 A | 9/1992 | Chen et al. |
| 5,777,913 A | 7/1998 | Rasmusson |
| 6,078,567 A * | 6/2000 | Traill et al. .................... 370/289 |
| 7,009,945 B1 * | 3/2006 | Tang et al. ..................... 370/286 |
| 7,839,758 B1 | 11/2010 | Gregorian et al. ............. 370/201 |
| 2002/0027517 A1 * | 3/2002 | Gata et al. ...................... 341/141 |
| 2006/0133303 A1 | 6/2006 | Shida |
| 2009/0046790 A1 * | 2/2009 | Soliman ........................ 375/260 |
| 2010/0057821 A1 * | 3/2010 | Menkhoff ...................... 708/300 |

* cited by examiner

*Primary Examiner* — Donald Mills
*Assistant Examiner* — Henry Baron
(74) *Attorney, Agent, or Firm* — Sterne, Kessler, Goldstein & Fox PLLC

(57) ABSTRACT

A method and system are described for canceling an echo signal with an echo canceller in the analog domain. In one embodiment, a system includes an echo canceller that includes an interpolation unit, operating in a digital domain, that receives a first digital echo estimate signal from an LMS unit and generates a second digital echo estimate signal without oversampling. A digital-to-analog converter (DAC) receives the second digital echo estimate signal and generates an analog echo estimate signal without oversampling. The echo canceller prevents the DAC from adding a high frequency component to the analog echo estimate signal. A subtractor adds the analog echo signal to an incoming signal having an echo signal. The subtractor generates an analog signal with reduced echo signal in the useful frequency band of the incoming signal.

21 Claims, 7 Drawing Sheets

US 8,917,582 B2

ANALOG ECHO CANCELLER WITH INTERPOLATING OUTPUT

RELATED APPLICATION

The present application is a continuation of U.S. patent application Ser. No. 12/236,408 filed Sep. 23, 2008 now U.S. Pat. No. 7,839,758, entitled "Analog Echo Canceller with Interpolating Output," which application is incorporated herein by reference.

TECHNICAL FIELD

Embodiments of the invention relate to the field of canceling echo signals; more specifically, embodiments of the invention relate to using an interpolation filter operating in the digital domain as part of generating an echo estimate.

BACKGROUND

Digital signal processing is widely used to process data carrying signals to remove, for example, inter-symbol interference (ISI), echoes, cross talk and other impairments, and to provide filtering, correlation and other processing. Echo cancellation involves first recognizing the originally transmitted signal that re-appears, with some delay, in the transmitted or received signal. Once the echo is recognized, it can be removed by 'subtracting' it from the transmitted or received signal. This technique is generally implemented using a digital signal processor (DSP), but can also be implemented in software. Echo cancellation is done using either echo suppressors or echo cancellers, or in some cases both. In a full duplex data communication system having a single pair of wires, transmit and receive signals share the same channel bandwidth and their spectrums overlap. The signal that is applied to the receiver contains an attenuated and impaired version of the transmitted signal from the remote end plus a portion of the local transmit signal. In such a system an echo canceller is needed before the receiver can process the receive signal to recover the data. One implementation of a conventional echo canceller (EC) is shown in FIG. 1. The echo canceller accepts as input a composite signal (TX+RX) which is comprised of the "wanted" receive and "unwanted" local transmitted signals. The purpose of the echo canceller is to filter out the unwanted local transmitted component and deliver to the system the receive component for further processing. It accomplishes this task by first recognizing and then estimating a replica of the transmitted signal and subsequently subtracting it from the composite signal hence recovering the receive component.

In a DSP based system, the transmitter and echo canceller both operate at sample rate $F_s$ where the sampling period $T_s$ is $1/F_s$. The echo canceller is an adaptive transversal filter that accepts as input, samples of the local transmit signal. Each sample period $T_s$, the echo canceller computes one echo sample and delivers it to a digital-to-analog converter (DAC) which in turn converts it to an analog signal and subtracts it from the composite signal. The signal at the output of the subtractor is the receive signal which also serves as the error signal for the echo canceller. The analog receive signal (error signal) is fed into an analog-to-digital converter (ADC) which is sampled at the same rate $F_s$ and converted to a digital format. The digital signal is fed into the DSP block for further processing of the receive signal. The same signal serves as an error signal and is also fed into the coefficient update block of the echo canceller. This block updates the coefficients of the adaptive filter using a least mean square (LMS) algorithm in such a way that it minimizes the correlation (resemblance) between the receive (error) and transmitted signals. The combination of the transversal filter and the LMS coefficient update blocks form the echo canceller.

In an echo canceller such as the one shown in FIG. 1 that operates at a sample rate of $F_s$ the spectral (frequency) components of the echo can only be cancelled in a range limited to $F_s/2$. Beyond this range the echo canceller is not effective.

In addition to the echo canceller not being effective beyond Fs/2, in the process converting the digital input to analog waveform via the DAC it ends up adding some unwanted components beyond Fs/2. Thus, from 0 to Fs/2 the echo canceller cancels echo and beyond Fs/2 the echo canceller aggravates the echo. This addition of unwanted components results in increased distortion and jitter due to extra high frequency components added by the DAC beyond Fs/2.

SUMMARY OF THE INVENTION

A method and system are described for canceling an echo signal with an echo canceller in the analog domain. In one embodiment, a system includes an echo canceller to generate a first digital echo estimate signal based upon an incoming signal having an echo signal. The echo canceller also includes an interpolation filter unit, operating in a digital domain, that generates a second digital echo estimate signal without oversampling based on the first digital echo estimate signal. A DAC receives the second digital echo estimate signal and generates an analog echo estimate signal without oversampling. The interpolating filter prevents the DAC from adding a high frequency component to the analog echo estimate signal.

A subtractor subtracts the analog echo estimate signal from the incoming signal having the echo signal. The subtractor generates an analog signal with reduced echo signal in the useful frequency band or bandwidth of the incoming signal and no significant additional high frequency component is added outside of the useful frequency band or bandwidth of the incoming signal. An ADC is coupled to the subtractor and receives the analog signal from the subtractor. The ADC generates a digital signal sent to a DSP unit.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and system are described for canceling an echo signal with an echo canceller in the analog domain. In one embodiment, a system includes an echo canceller that includes a least mean square (LMS) unit to receive a digital error signal based upon an incoming signal having an echo signal. The LMS unit provides coefficient updates to an adaptive transversal filter, which also receives samples of a local transmit signal. The LMS unit using a LMS algorithm minimizes the correlation between the digital error signal and the local transmit signal. The adaptive transversal filter generates a first digital echo estimate signal based upon the local transmit signal and the digital error-signal. The echo canceller also includes an interpolation filter unit that receives the first digital echo estimate signal and generates a second digital echo estimate signal without oversampling. A DAC receives the second digital echo estimate signal and generates an analog echo estimate signal without oversampling. The interpolating filter reduces substantially a high frequency component from being added by the DAC to the analog echo estimate signal.

A subtractor subtracts the analog echo estimate signal from the incoming signal having the echo signal. The subtractor generates an analog signal with substantially no echo signal in the useful frequency band or bandwidth of the incoming signal and no additional high frequency component is added outside of the useful frequency band or bandwidth of the incoming signal. An ADC is coupled to the subtractor and receives the analog signal from the subtractor. The ADC generates a digital signal sent to a DSP unit.

In the following description, numerous specific details are set forth, such as specific frequencies, in order to provide a thorough understanding of the present invention. It will be apparent to one skilled in the art, that the present invention may be practiced without these specific details. In other instances, well-known circuit elements, such as amplifiers and multipliers, are not described in detail in order to not unnecessarily obscure the present embodiments.

Figure 1:
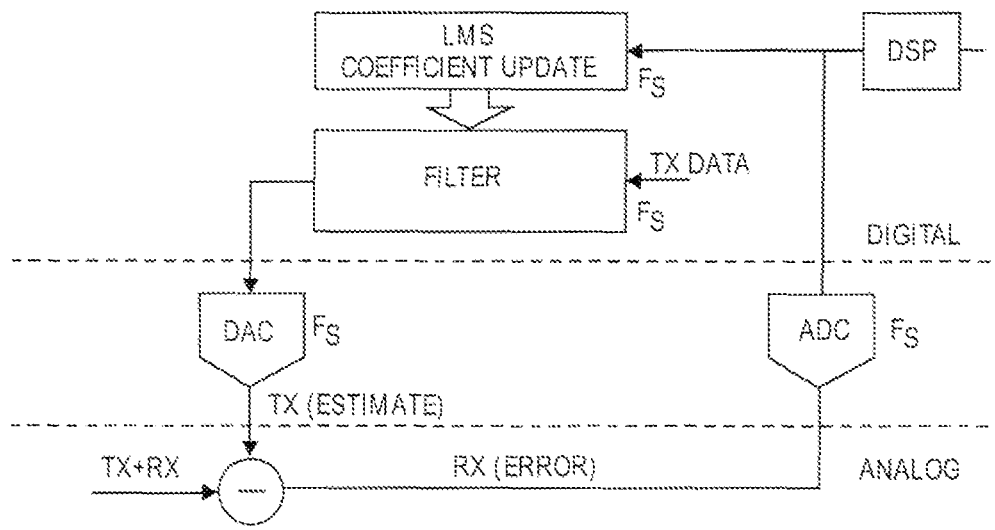
FIG. 1 illustrates a conventional circuit for canceling an echo signal.
Figure 2:
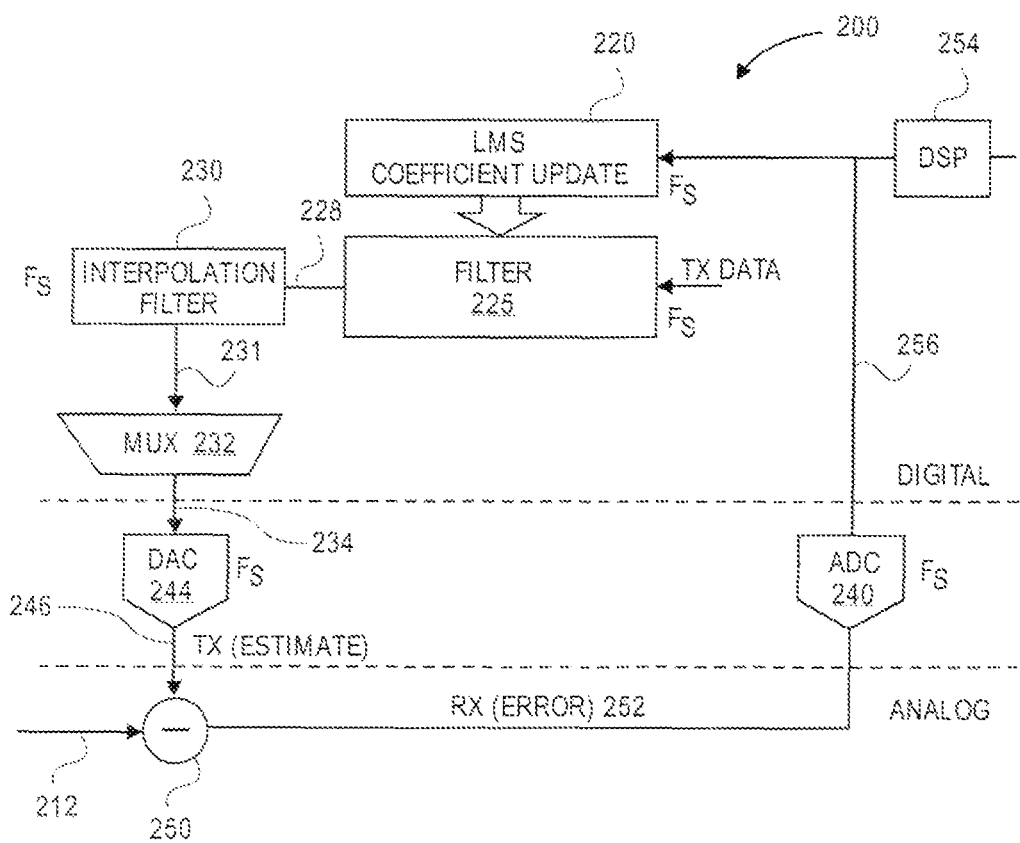
FIG. 2 illustrates a circuit for canceling an echo signal in an analog domain in accordance with one embodiment.

FIG. 2 illustrates a circuit for canceling an echo signal in an analog domain in accordance with one embodiment. The circuit 200 includes a LMS unit 220, an adaptive filter 225, an interpolation filter 230, a multiplexer 232, a DAC 244, a subtractor 250, an ADC 240, and a DSP unit 250. An incoming signal 212 (RX+TX) includes "wanted" receive and "unwanted" local transmitted signals. The subtractor 250 subtracts the unwanted transmit signals and generates the receive signals 252 which are also used as error signals. In some embodiments, the subtractor 250 is replaced with a summer or arithmetic logic unit or other unit providing similar functionality.

The ADC 240 receives the receive (error) signals 252 and generates digital receive (error) signals 256 that are sent to a digital signal processing (DSP) unit 254 and also feed into the LMS unit 220. The LMS unit provides coefficient updates to the adaptive transversal filter 225, which also receives samples of local transmit signals (TX data). The LMS unit 220 using a LMS algorithm minimizes the correlation between the digital error signals 256 and the local transmit signals (TX data). The adaptive transveral filter 225 generates digital echo estimate signals 228 based upon the local transmit signals and the digital error signals. Operating in the digital domain, the interpolation filter 230 applies interpolation to the digital echo estimate signals 228 to generate additional data points and corresponding digital echo estimate signals 231. The interpolation filter 230 acts as a low pass filter in generating the digital echo estimate signals 231. In one embodiment, the digital echo estimate signals 231 are combined into a digital echo estimate signal 234 using the multiplexer 232, which sends the signal 234 to the DAC 244. In another embodiment, a single digital echo signal 231 is directly sent to the DAC 244 with no multiplexer 232 being used. The echo DAC 244 converts the digital estimate echo signal 234 into an analog estimate echo signal 246. The signal 246 is subtracted from the signal 212 to generate the receive signals 252 having a reduced echo signal across a certain frequency range (e.g., 0 to 400 MHz). The signals 252 are sent to ADC 240 which converts these signals into the digital domain before being sent to the DSP unit 254 for further processing.

The addition of high frequency components by the DAC 244 can be avoided by using the interpolation filter 230 in conjunction with the DAC running at 2 Fs. The interpolation filter 230 is a digital filter that suppresses the echo estimate beyond Fs BEFORE it is received by the DAC 244.

For the example described above, the DAC 244 and interpolation filter 230 may each have a clock frequency of 1.6 GHz and the ADC 240 may have a clock frequency of 800 MHz. In another embodiment, the interpolation filter 230 includes two or more filters each having a clocking frequency of 800 MHz. In contrast to prior approaches, the echo signal is reduced between 0 and 400 MHz without having the DAC 244 add a high frequency component to the digital estimate echo signal 246.

Figure 5A:
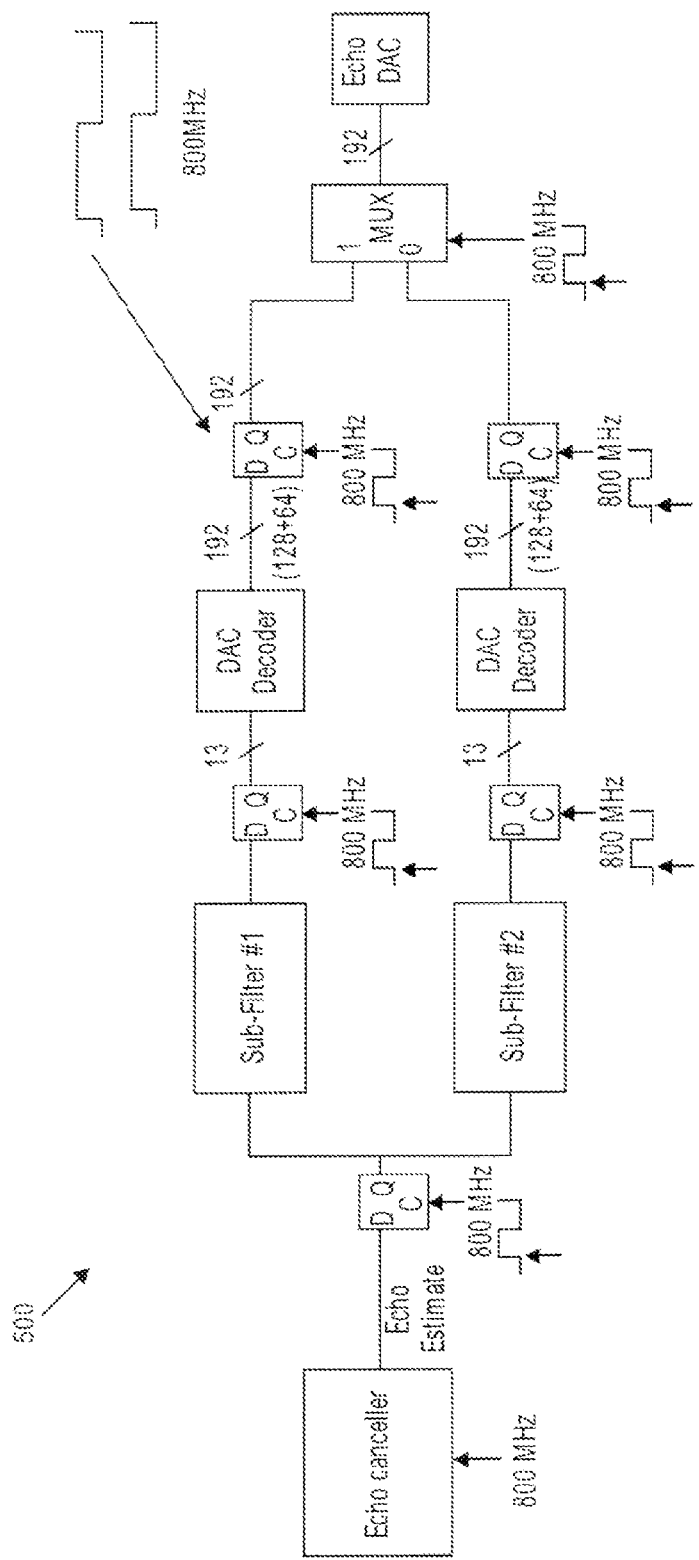
FIG. 5A illustrates a circuit for canceling an echo signal with an interpolating unit having two sub-filters in accordance with one embodiment.

In one embodiment, the interpolation filter is a low pass filter that is implemented using well known poly phase configuration as illustrated in FIG. 5A. Poly phase configuration enables running the digital interpolation filter 500 at Fs, with the ability to shape the spectrum up to 2 Fs. This way, the echo is cancelled up to Fs without increasing the residual echo levels beyond Fs.

Figure 5B:
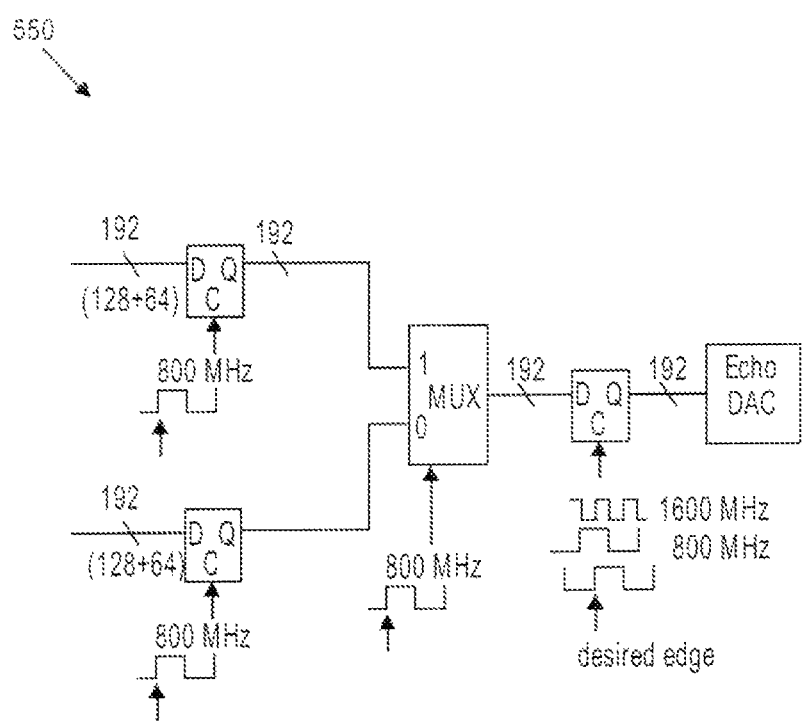
FIG. 5B illustrates a circuit for canceling an echo signal with an interpolating unit having two sub-filters in accordance with another embodiment.

For the DAC 244 to run at 2 Fs, a two phase implementation (2 filters processing in parallel) of interpolation filters is used. For example, in FIG. 5A the sub-filter #1 and sub-filter #2 form two filters operating in parallel. This concept can be extended to the general case where the echo DAC runs N*Fs, by using N phase (N filters processing in parallel) interpolation filters, all phases of which are running at Fs. FIG. 5B illustrates another implementation of the interpolating filter 500 illustrated in FIG. 5A in accordance with another embodiment. The interpolating output 550 in FIG. 5B includes an additional D latch or flip-flop coupled between the multiplexer and the echo DAC in comparison to the interpolating filter 500 illustrated in FIG. 5A.

Figure 6:
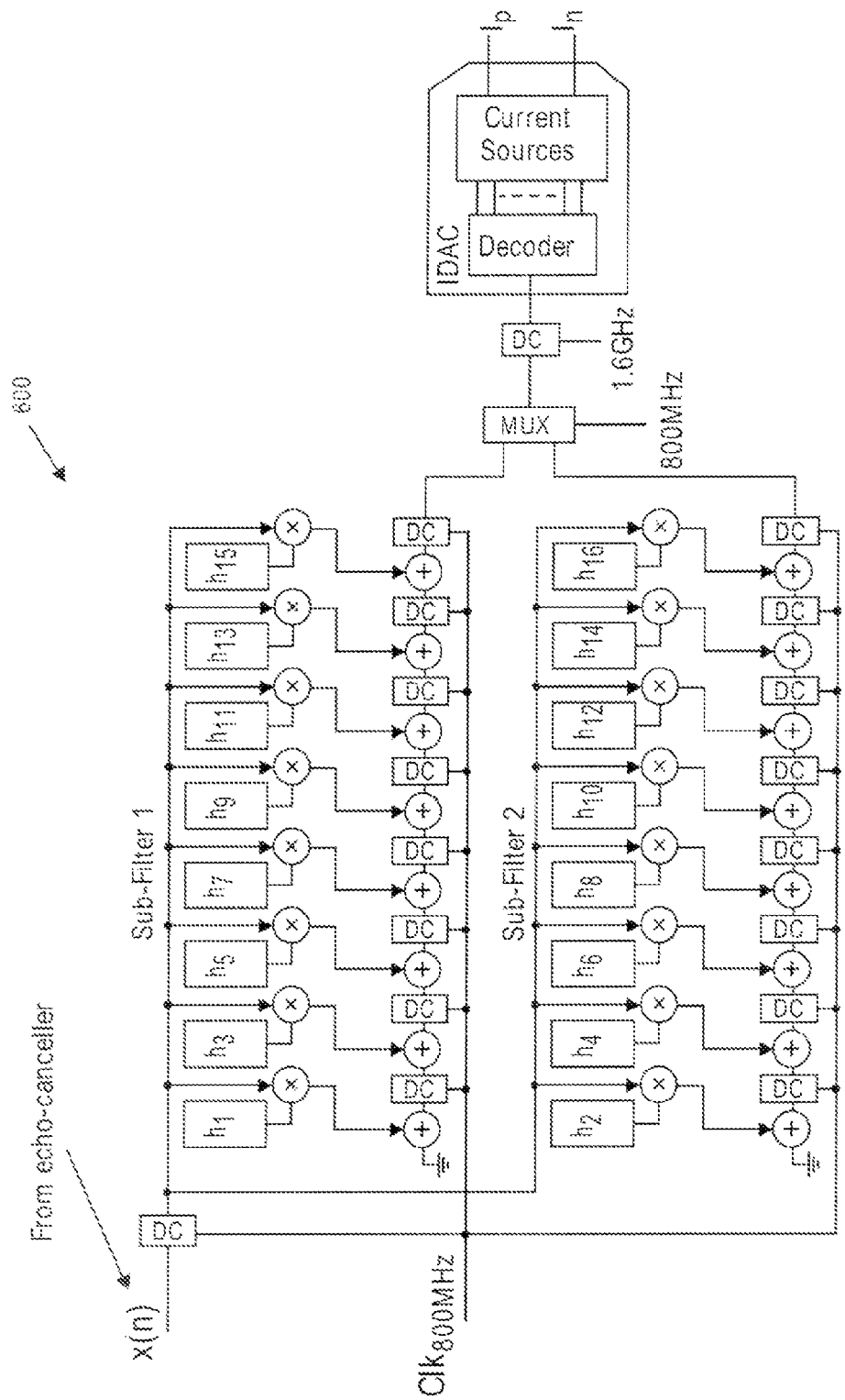
FIG. 6 illustrates an interpolating unit having two sub-filters in accordance with one embodiment.

FIG. 6 illustrates an interpolating unit having two sub-filters in accordance with one embodiment. The interpolation filter 600 applies interpolation to signal x(n) to generate additional data points for the output echo estimate signals. Each sub-filter operates at a clocking frequency of 800 MHz and cancels a portion of the echo signal across a certain frequency range. The output echo estimate signals are multiplexed and sent to the DAC operating at 1.6 GHz.

Figure 3:
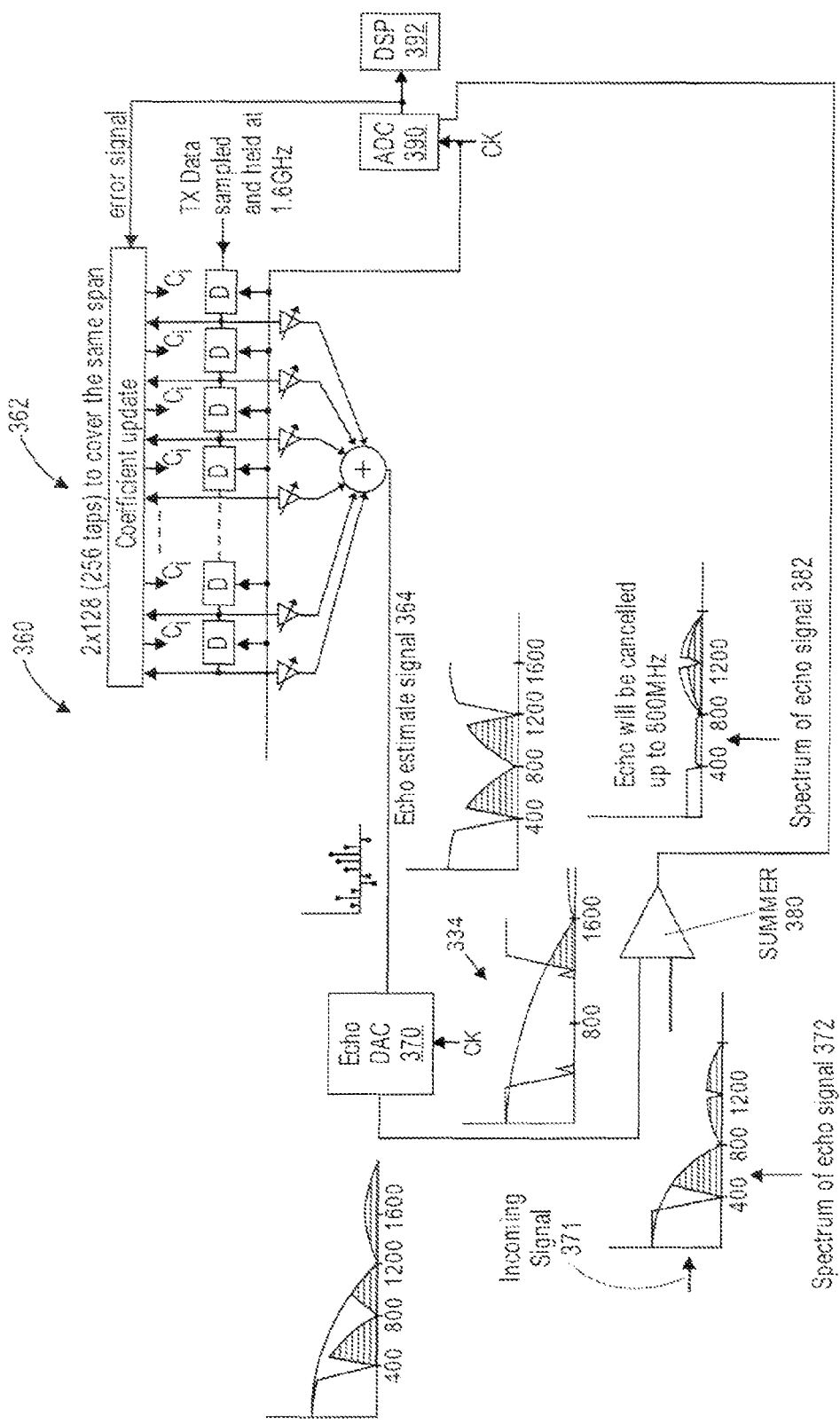
FIG. 3 illustrates a circuit for canceling an echo signal in an analog domain in accordance with another embodiment.

FIG. 3 illustrates a circuit 360 for canceling an echo signal in an analog domain in accordance with one embodiment. The circuit 360 includes a LMS 362, a DAC 370, a summer 380, an ADC converter 390, and a DSP 392. The circuit 360 includes similar components to the circuit 200, but the circuit 360 has no interpolating filter. The circuit 360 generates a signal 382 having a reduced echo between 0 and 800 MHz.

Figure 4:
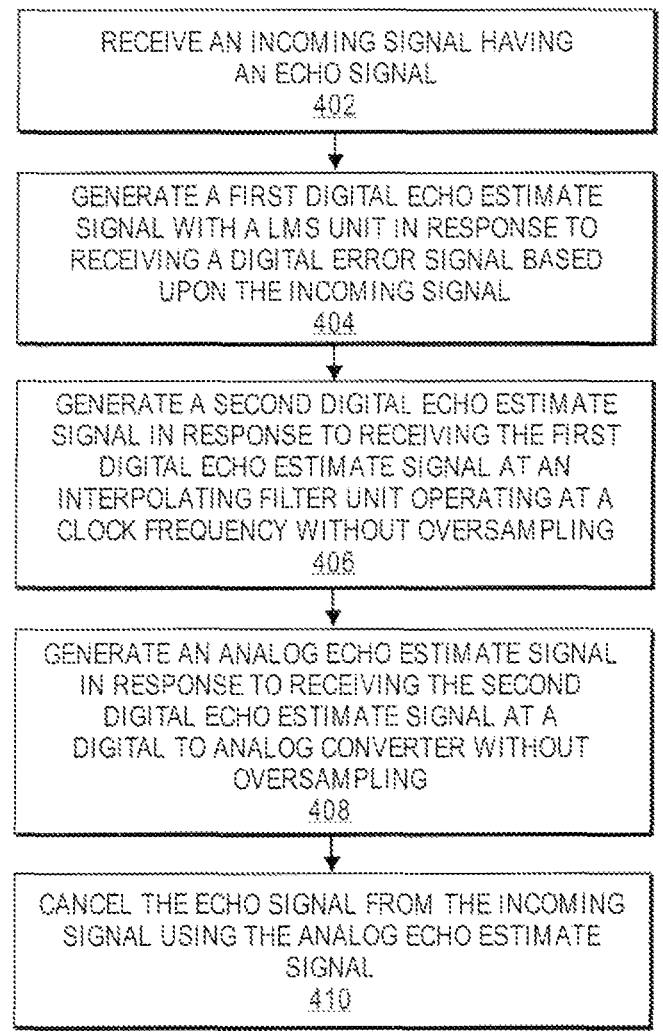
FIG. 4 illustrates a flowchart which represents a process for canceling an echo signal in accordance with one embodiment.

FIG. 4 illustrates a flowchart which represents a process for canceling an echo signal in accordance with one embodiment.

The process includes receiving an incoming signal having an echo signal at processing block 402. Next, the process includes generating a first digital echo estimate signal with a LMS unit in response to receiving a digital error signal based upon the incoming signal at processing block 404. Next, the process includes generating a second digital echo estimate signal in response to receiving the first digital echo estimate signal at an interpolation filter unit operating at a clocking frequency without oversampling at processing block 406. Next, the process includes generating an analog echo estimate signal in response to receiving the second digital echo estimate signal at an digital to analog (D/A) converter without oversampling at processing block 408. Finally, the process includes canceling the echo signal from the incoming signal using the analog echo estimate signal at processing block 410.

Thus, improved analog front end processing has been described for a data carrying signal received over a twisted pair or pairs. The echo canceller prevents the DAC from adding a high frequency component to the incoming signal. Advantageously, the main ADC receives input signals with less jitter reducing the jitter sensitivity of the ADC.

Although present embodiments have been described with reference to specific embodiments, it will be evident that various modifications and changes may be made to these embodiments without departing from the broader spirit and scope of the present embodiments. Accordingly, the specification and drawings are to be regarded in an illustrative rather than a restrictive sense.

What is claimed is:

1. An echo canceller, comprising:
an analog to digital converter (ADC) configured to convert, at a first clock frequency, a received analog error signal to a digital error signal;
a digital interpolation filter comprising a plurality of sub-filters operating at the first clock frequency, wherein the digital interpolation filter is configured to process a first digital echo estimate signal, generated based on the digital error signal, in parallel using the plurality of sub-filters to generate a plurality of interpolated first digital echo estimate signals; and
a multiplexer configured to combine the interpolated first digital echo estimate signals to generate a second digital echo estimate signal at a second clock frequency greater than the first clock frequency.

2. The echo canceller of claim 1, wherein the second clock frequency comprises a frequency at least double that of the first clock frequency.

3. The echo canceller of claim 1, further comprising:
a digital-to-analog converter (DAC), coupled to the multiplexer, configured to convert, at the second clock frequency, the second digital echo estimate signal to an analog echo estimate signal; and
a subtractor, coupled to the DAC, configured to subtract the analog echo estimate signal from an incoming signal having an echo signal to generate an analog error signal with a reduced echo signal.

4. The echo canceller of claim 1, further comprising:
an adaptive filter, coupled to the digital interpolation filter, configured to generate the first digital echo estimate signal based on a local transmit signal; and
a least means squared (LMS) unit configured to:
reduce a correlation between the digital error signal and the local transmit signal, and
generate adaptive filter coefficient updates based on the correlation.

5. A method, comprising:
processing, at a first clock frequency, a first digital echo estimate signal using parallel paths to generate a plurality of interpolated first digital echo estimate signals; and
combining the interpolated first digital echo estimate signals to generate a second digital echo estimate signal at a second clock frequency greater than the first clock frequency; and
generating an analog echo estimate signal based on the second digital echo estimate signal with a digital to analog converter (DAC) unit operating at the second clock frequency.

6. The method of claim 5, wherein the second clock frequency comprises a frequency at least double that of the first clock frequency.

7. The method of claim 5, further comprising:
generating an analog error signal with a reduced echo signal by subtracting the analog echo estimate signal from an incoming signal having an echo signal.

8. The method of claim 5, further comprising:
generating the first digital echo estimate signal based on a local transmit signal;
reducing a correlation between a digital error signal and the local transmit signal using a least means squared (LMS) algorithm; and
generating adaptive filter coefficient updates based on the correlation.

9. The method of claim 7, further comprising:
converting, at the first clock frequency, the analog error signal to a digital error signal.

10. An echo canceller, comprising:
a filter, wherein the filter comprises a plurality of sub-filters configured to operate at a first frequency, and wherein the filter is configured to process an echo estimate in parallel using the plurality of sub-filters to generate a plurality of additional echo estimates;
a multiplexer configured to combine the plurality of additional echo estimates to generate an output signal at a second frequency greater than the first frequency, wherein a ratio of the second frequency to the first frequency is determined based on a number of the plurality of sub-filters;
a subtractor coupled to the multiplexer, wherein the subtractor is configured to:
receive the output signal and an incoming signal, and
subtract the output signal from the incoming signal to generate a received error signal; and
an analog to digital converter (ADC) coupled to an output of the subtractor.

11. The echo canceller of claim 10, further comprising:
a second filter coupled to the filter, wherein the second filter is configured to generate the echo estimate based on a local transmit signal.

12. The echo canceller of claim 11, further comprising:
a least mean square (LMS) unit coupled to the subtractor, wherein the LMS unit is configured to generate coefficient updates for the second filter based on the received error signal.

13. The echo canceller of claim 10, further comprising:
a digital signal processing (DSP) unit coupled to the subtractor, wherein the DSP unit is configured to process the received error signal.

14. The echo canceller of claim 11, further comprising:
an analog to digital converter (ADC) coupled to an output of the subtractor and to an input of the second filter.

15. The echo canceller of claim 14, wherein a frequency of the ADC is approximately equal to the first frequency.

16. The echo canceller of claim 15, wherein each of the plurality of sub-filters is configured to cancel a portion of the echo estimate across a predetermined frequency range.

17. The echo canceller of claim 11, wherein the second filter is further configured to reduce a correlation between the incoming signal and the local transmit signal.

18. The echo canceller of claim 1, wherein the plurality of sub-filters are arranged in a parallel configuration.

19. The echo canceller of claim 1, wherein a ratio of the second clock frequency to the first clock frequency is determined by a number of the plurality of sub-filters.

20. The echo canceller of claim 3, wherein a ratio of the second clock frequency to the first clock frequency is determined by a number of the plurality of sub-filters.

21. The method of claim 5, wherein a ratio of the second clock frequency to the first clock frequency is determined by a number of the parallel paths.

\* \* \* \* \*